Aug. 30, 1938.   D. O. LANE   2,128,653
BASKET LINER
Filed Oct. 22, 1937   3 Sheets-Sheet 1

Inventor.
David O. Lane
by Parks & Carter
Attorneys.

Aug. 30, 1938. D. O. LANE 2,128,653
BASKET LINER
Filed Oct. 22, 1937 3 Sheets-Sheet 2
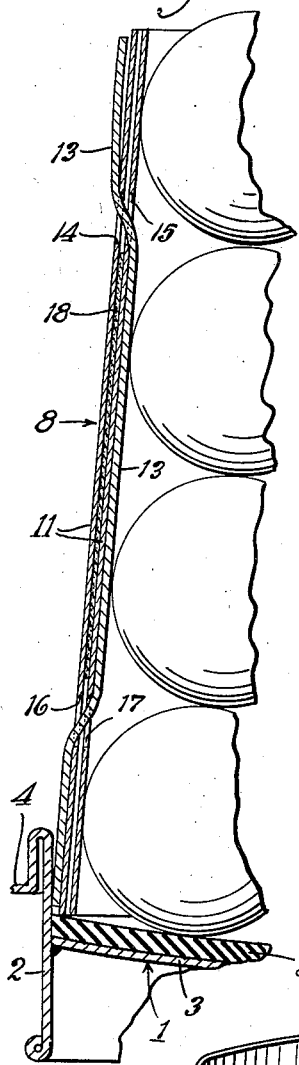
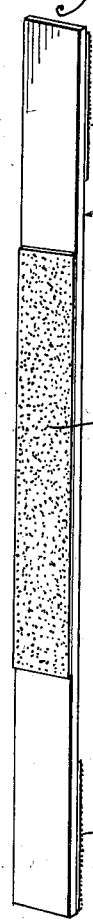
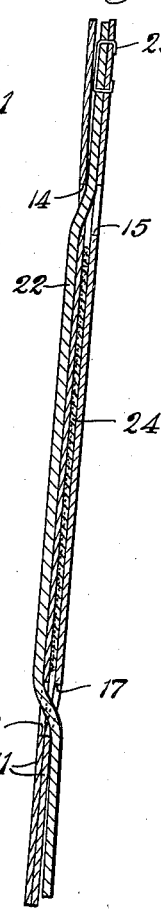
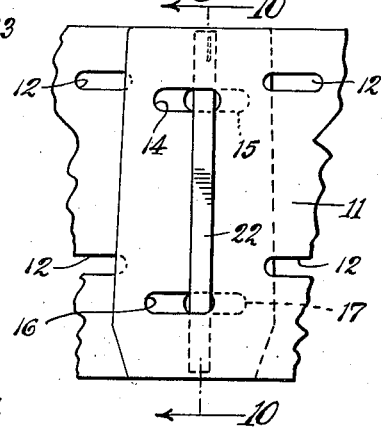
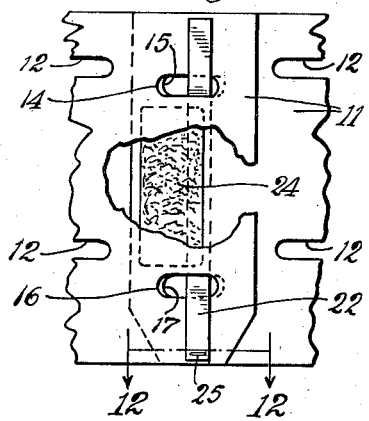
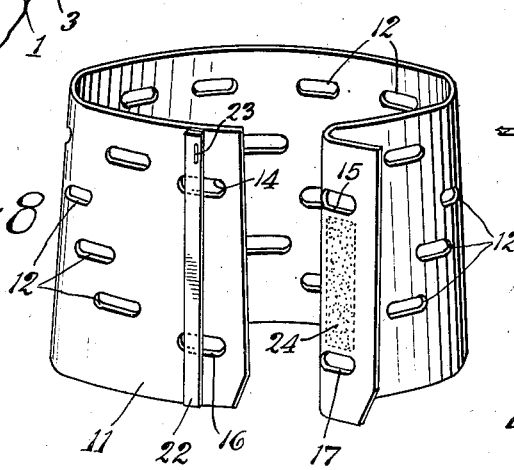
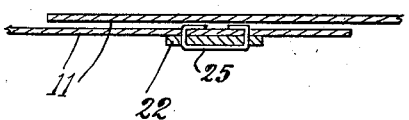
Inventor
David O. Lane
by Parker C Carter
Attorneys Aug. 30, 1938.   D. O. LANE   2,128,653
BASKET LINER
Filed Oct. 22, 1937   3 Sheets-Sheet 3
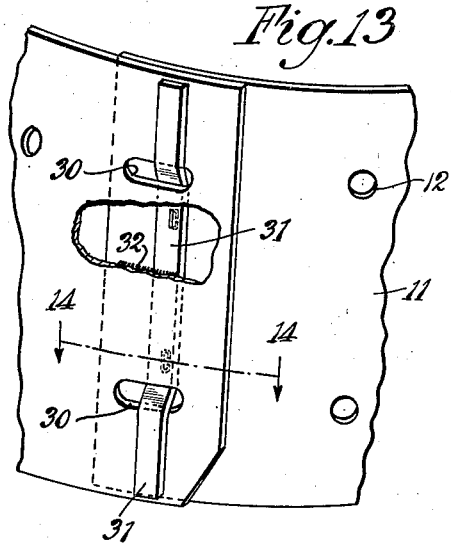
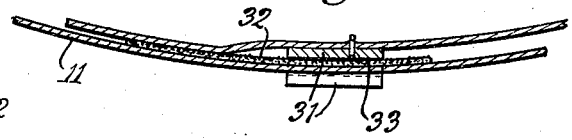
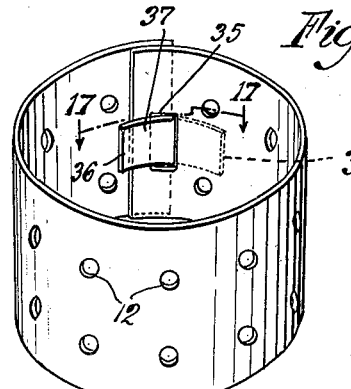
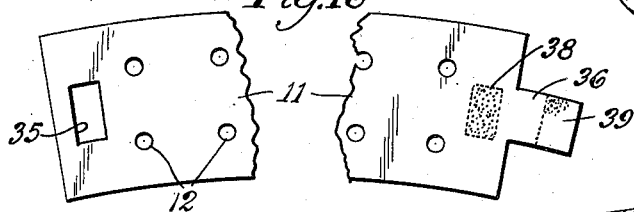
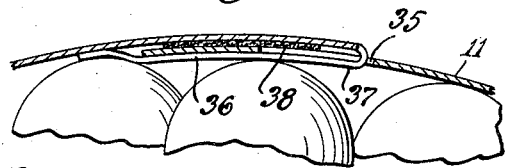
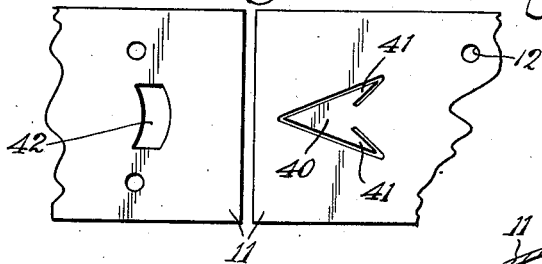
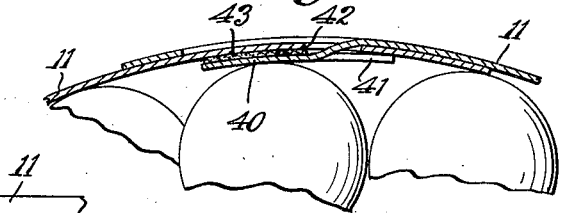
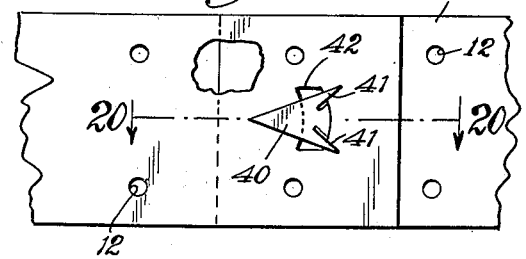
Inventor
David O. Lane
by Parker Carter
Attorneys.

Patented Aug. 30, 1938

2,128,653

UNITED STATES PATENT OFFICE 2,128,653

BASKET LINER

David O. Lane, Fort Valley, Ga.

Application October 22, 1937, Serial No. 170,414

16 Claims. (Cl. 217—3)

My invention relates to improvements in basket liners and has for one object to provide a new and improved form of liner which may be used in connection with the well-known conventional method of packaging fruit and the like.

It will be understood that fruit is first arranged on a face plate, then a thin flexible paper or paper-like liner taking the form of a cylinder or perhaps a truncated cone is placed on the face plate encircling the fruit thereon, with the larger diameter below. A tub or reinforcing ring is associated with this thin liner and the fruit is then poured or fed into the tub until it is filled. The fruit falls down into the tub with considerable speed and impact and if the liner alone were used the impact of the flowing fruit would break it. The tub or reinforcing ring prevents this. As soon as the proper amount of fruit has been fed out the feed is stopped, the tub is removed, and the mass of fruit is retained or held in position by the thin flexible paper liner for a time long enough to permit the operator to substitute the basket or container for the tub. Thereafter, the basket with the liner and the face plate is turned over. The fruit settles into the basket, the face plate is removed, and the liner is left protecting the fruit from contact with the actual surface of the basket.

Many types and forms of liners have been used. Sometimes their ends are cemented. Sometimes they are held by interlocking lugs or tabs. Sometimes they are held by pins or keys. Sometimes the liner is weakened so that it tears. But in any event the general proposition is that you have some kind of a liner which holds the fruit during the time between the removal of the tub and the application of the basket and which yields to permit the fruit to fill the basket and settle down therein.

Tubs and face plates may vary somewhat in size. The baskets will frequently vary slightly in size and shape. It is essential that the liner, tub and face plate may be small enough so that the smallest possible diameter basket may be used. On the other hand, the liner must expand sufficiently to permit the largest possible diameter basket to be filled. A slight change in the depth of the filling is not important but a slight change in the diameter of the package in the basket is important and if the liner should hold the fruit away from the walls of the basket the shipper would immediately be subject to criticism.

The time during which the liner itself supports the fruit without assistance from the tub or the basket is very short. The operator lifts the tub off and immediately replaces the basket. It is done in a very few seconds. The fruit is at rest when the tub is removed. It may flow a little before the basket is put in place. I propose, therefore, to provide means to limit and control the rate of expansion of the liner. It is old to provide some kind of expansible means, free to expand and contract to fit the tub and free to expand under the weight of the column of fruit to a maximum. This necessitates the basket being big enough to take that maximum. I propose while permitting expansion of the column of fruit to nevertheless check and control the rate at which it expands so that under some circumstances the expansion of the column or mass of fruit will be going on even up to the time the basket is put in place. There are many ways in which this can be done. I can sand one of the engaging walls of the overlapping basket liner ends, or perhaps sand them both. Or I can sand the key which is threaded through apertures in the overlapping liner ends. Or I can sand the key and sand the ends. I can coat the ends and the key, one or both, with an adhesive of high viscosity which will yield and flow but do it gradually. I can use this sanding or this adhesive at a point intermediate the ends of the liner and fold or pleat the liner so it will yield. I can use folded tabs which can be sanded or cemented with some kind of viscous cement and so yield gradually. My preferred arrangement, however, takes the form of a key or stick of cardboard or stiff paper fastened to the end of the liner, threaded through apertures in the opposed end of the liner, presenting a smooth side to the fruit but a rough one or sanded side to the liner, and held against the liner by the pressure of the fruit, the apertures being elongated so that as pressure is applied by the column of fruit the key is gradually forced along the opposed liner member and gradually expands.

It will be understood that this control of the rate of expansion is very important. If you have a liner with a key for instance which is contracted in the tub and which will expand when it leaves the tub, when you suddenly remove the tub and release the pressure the weight of the column of fruit will suddenly expand and it may be sufficient, that is the inertia and impact may be sufficient, to tear the paper before the basket is put in place, whereas when you check the rate of flow you reduce the inertia forces and a paper which would not be strong enough to stop the violent flow that takes place after the tub is removed is strong enough to hold the load as the rate of flow is gradually checked by the resistance means.

My invention is illustrated more or less diagrammatically in the accompanying drawings wherein:

Figure 6 is an enlarged vertical section taken on the line 6—6 of Figure 2;

Figure 7 is a perspective view of a variant locking member;

Figure 8 is a perspective view of a liner illustrating means for attaching the locking member thereto;

Figure 9 is a fragmentary side elevation of the liner of Figure 8 in locking position;

Figure 10 is an enlarged vertical section taken on the line 10—10 of Figure 9;

Figure 11 is a partial side elevation similar to Figure 9 illustrating another way of attaching the locking member to the liner;

Figure 12 is an enlarged section taken on the line 12—12 of Figure 11;

Figure 13 is a fragmentary perspective view illustrating a further variation;

Figure 14 is an enlarged cross section taken on the line 14—14 of Figure 13;

Figure 15 is a perspective view of a further form of locking means;

Figure 16 is a plan view of a blank of the liner of Figure 15 with parts broken away;

Figure 17 is an enlarged cross section taken on the line 17—17 of Figure 15;

Figure 18 is a plan view of the ends of a further variant form of liner;

Figure 19 is a view similar to Figure 18 showing the fastened end of the liner;

Figure 20 is an enlarged cross section taken on the line 20—20 of Figure 19.

Figure 1:
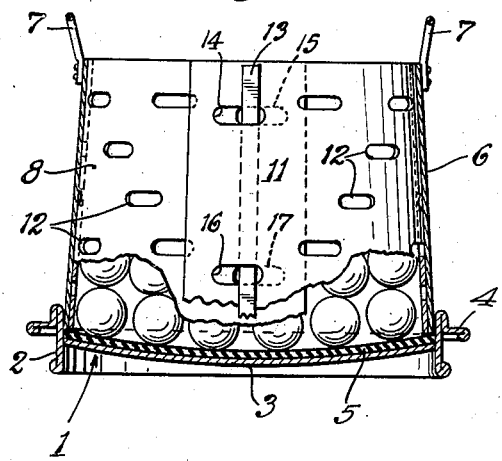
Figure 1 is a side elevation in part section of a basket facing apparatus.
Figure 2:
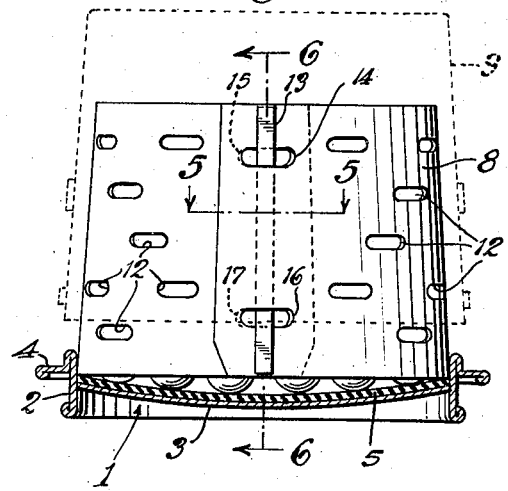
Figure 2 is a similar view to Figure 1 showing the tub removed.

1 is a basket facing plate of the conventional type. It comprises in general an annular collar 2, a convex head 3, a peripheral reinforcing flange which serves as a handle 4, and a rubber or similar fruit receiving surface 5 which may be smooth as shown in Figure 1 or may be apertured or resisted, if desired. 6 is a metal tub, truncated conical in shape, open at top and bottom, provided with handles 7 and adapted to penetrate within the collar 2. This tub is of larger diameter at bottom than at top so that it may subsequently be withdrawn after the fruit has filled the basket liner 8, which is shown in Figure 1 supported by the tub and closely engaging it and is shown in Figure 2 after the tub has been removed and as a basket 9 in dotted lines is about to be applied. It will be understood that this facing plate liner tub assembly is first brought together as in Figure 1, the individual fruit in the basket which will form the face being placed by hand on the face plate, whereupon the fruit is allowed to flow in the tub and fill it, resting upon the previously face forming fruit. When the tub is removed, the basket liner holds the fruit in assembled position ready for the application of the basket as indicated in Figure 2.

Figure 3:
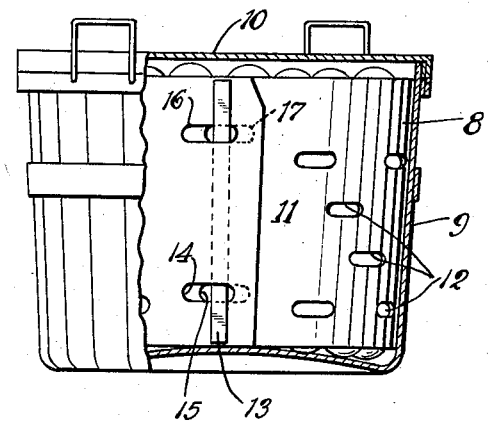
Figure 3 is a view in part section of a basket filled with fruit.

Figure 3 shows the basket applied. This is accomplished by bringing the basket down beyond the dotted line position in Figure 2 until it rests upon the face plate. The basket and plate are then turned over. The face plate is removed, the fruit settles down into the basket expanding the liner sufficiently to bring it into firm contact with the basket and the basket cover 10 is then applied.

My invention has to do with the peculiar characteristics of my form of liner. The basket, the cover, the tub and the face plate are as illustrated standard and well known in the art.

Figure 4:
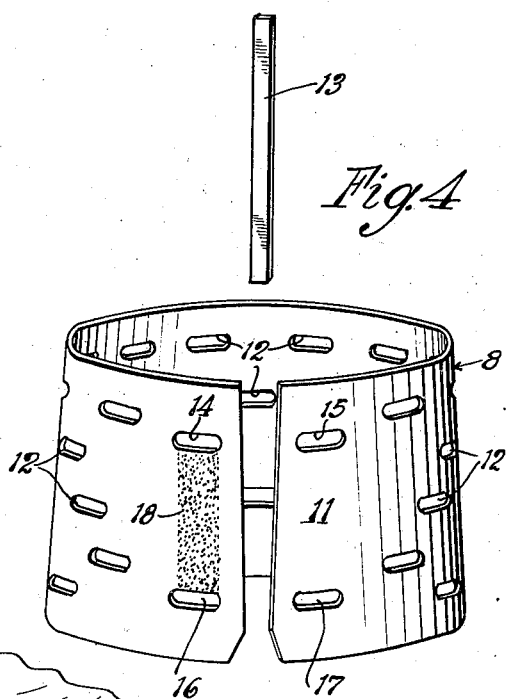
Figure 4 is a perspective view of the liner and locking member before interlocking.
Figure 5:
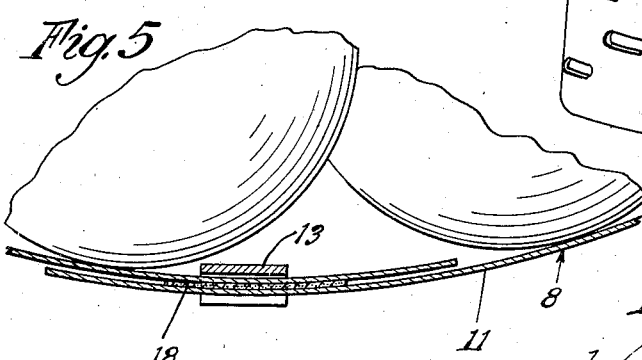
Figure 5 is an enlarged section taken on the line 5—5 of Figure 2.

A suitable form of basket liner is shown in Figure 4. It comprises a generally oblong sheet of paper which may be grass paper or of better quality as desired indicated at 11. This sheet has a number of apertures 12 therethrough to provide ventilation. It is bent into a generally truncated conical or slightly distorted cylindrical form and the free ends are interlocked by a stick 13 which is caused to penetrate the registering apertures 14, 15, 16, 17, adjacent the ends of the liner. In the form shown in Figure 4 that part of the surface of the liner between the openings 14 and 16 is sanded or roughened as at 18, being so disposed that when the stick is interlaced through the holes 14, 15, 16, 17 and when the pressure of the fruit forces the liner out against the tub, the sanded portion of the liner is brought into close contact with the stick so that when the tub is withdrawn, the initial pressure has previously been applied to the inter-related parts of liner and stick so that the tendency of the fruit to flow outwardly and expand the liner which was previously overcome by the tub, will still be resisted by the relatively high frictional resistance to relative movement of stick and liner so that the expansion of the liner when it is no longer supported, instead of being sudden will be gradual. It will sometimes happen that this expansion will be slow enough so that it will not be entirely completed until the tub has been withdrawn or basket replaced or it may happen that this expansion will be complete before the basket is placed but in any event it will be so checked and controlled that as a result of this checking and brake action, the tendency of the liner to fracture by impact will be prevented.

In the following figures I have shown different modified forms of this brake liner. All of them are important because they lend themselves to different circumstances and conditions.

For instance, in the device shown in Figure 7, the sanded or frictional resistance portion is applied as at 20 to the central part of the stick on one side and at 21 to the ends of the stick on the other side. The idea is that in each case there will be a frictional resistance between the stick and the basket liner.

In Figure 8, the stick 22 is stapled at 23 at one end to the liner and may be passed as indicated in Figures 9 and 10 through one of the apertures in the opposed end of the liner and interlaced through the other registering apertures lower down in the liner. In this instance the sanding or frictional resistance roughening treatment is applied to the liner as at 24.

In Figures 11 and 12, a different form of stapling is used where the axis of the staple is at 25 immediately adjacent the edge of the liner and perpendicular to the main axis of the stick.

In the modification shown in Figure 13, only one end of the liner is apertured as at 30. The stick 31 is stapled to the opposed end of the liner at two spaced central points and the two ends of the stick are bent up through the apertures 30 to interlock. In this case the frictional resistance element is indicated at 32 and it may be on either one of the ends of the liner or as at 33 may be on the stick.

It will be understood of course that this frictional resistance may be provided as above outlined by sanding the liner, or stick or both or even by roughening either one of them. It is, of course, preferable that this frictional resistance be local because if the whole area were sanded or roughened, it would be bad for the fruit, it would be unpleasant and unsatisfactory to handle and would tend to resist those slight movements which are always necessary in connection with the adjustment and positioning of the liner parts in the basket and also roughening generally might interfere with the flow of the fruit and its settling and also be likely to interfere with the withdrawal of the tub.

In Figures 15 and 16, the stick is dispensed with. Here there is a single slot 35 in one end of the liner and a tongue 36 in the other. The tongue may be passed through the slot and bent back as indicated at 37. Both tongue and liner may be roughened or sanded as indicated at 38 or 39 or the opposite side of the tongue may be sanded. In the position shown in Figure 15 when the liner stretches the tongue is pulled out and caused to roll, this being resisted by the friction member. If it assumed the position shown in dotted lines in Figure 15, there would be no rolling but merely a sliding action, this also being resisted by the anti-friction feature.

The bent back tongue is illustrated in Figure 17 on a larger scale.

In Figures 18, 19 and 20 a further modification is illustrated where an arrow-like dart 40 having barbed ends 41 may be passed through a slot 42 which may be curved or straight as the case may be. The sanded area 43 is between the dart and the surface of the material, there being frictional resistance plus of course the final positive interlock stop.

It will be understood, of course, that this sanding or resistance treatment is only shown in the most diagrammatic form because the treatment of members to cause them to resist relative displacement is well known. It may be accomplished by applying a cement or varnish or glue with sand or carborundum, ground glass or the like mixed with it or by applying a cement or glue and then dusting the resistant material on it. Under some circumstances it is sufficient to provide a sticky surface which will not dry or oxidize during the time of storage, shipment and use or perhaps a gummy-like cement which will stretch. Again under some circumstances coating of the paper will be used or the paper itself may be corrugated. All of these various arrangements have, however, in common the single element that they all of them do cause some kind of interlock of the movable mating surfaces and resist their movement and all of them are associated with some means which after that movement has first been resisted, finally stop it altogether so that further movement must result only upon tearing of the liner.

Attention is also called to the specific form shown in Figures 13 and 14 because here the interlock member is permanently attached to one end of the liner freely interlocks with the other end but is not an integral part of it and so it is possible to provide the stiffening effect and the resistance effect of the interlocked member or stick without the danger of loss or displacement characteristic of the stick when freely inserted. This benefit of course is also found to some extent in the device shown in Figures 8 and 12 though in this case the whole stick must be manipulated, one end alone being inserted first in one and then in another, whereas in Figure 13, it is necessary to bring first one and then the other end of the stick into penetrating relationship with the liner.

I claim:

1. A basket liner comprising a sheet of relatively thin, flexible, smooth material, means for holding the ends thereof in overlapping relation, and means associated therewith for frictionally resisting relative longitudinal displacement of said ends, said means including a sand paper-like coating associated with one end of the liner.

2. A basket liner comprising a sheet of relatively thin flexible material, means for holding the ends thereof in overlapping relation including a separate member overlying and permanently fastened to one end, extending generally perpendicular to the longitudinal axis of the sheet and adapted to interlock with the other end thereof, friction means interposed between the member and the end with which it interlocks to resist relative longitudinal displacement the end holding means above referred to being adapted to permit relative longitudinal movement of the ends and after such movement to positively tie the ends together, the friction means being adapted to resist such relative movement up to the time that the holding means positively arrest it.

3. A basket liner comprising a sheet of relatively thin flexible material, means for holding the ends thereof in overlapping relation including a separate member overlying and permanently fastened to one end, extending generally perpendicular to the longitudinal axis of the sheet and adapted to interlock with the other end thereof, such end being perforate to permit passage of the member, friction means interposed between the member and the end with which it interlocks to resist relative longitudinal displacement the end holding means above referred to being adapted to permit relative longitudinal movement of the ends and after such movement to positively tie the ends together, the friction means being adapted to resist such relative movement up to the time that the holding means positively arrest it.

4. A basket liner comprising a flat, thin, flexible paper-like strip, the opposed ends folded together and overlapping, a relatively stiff transverse member permanently attached to one end at two widely opposed points, two apertures in the other end through which the two ends of such member are adapted to penetrate.

5. A basket liner comprising a flat, thin, flexible paper-like strip, the opposed ends folded together and overlapping, a relatively stiff transverse member permanently attached to one end at two widely opposed points, two apertures in the other end through which the two ends of such member are adapted to penetrate, the member being adapted to be held flat against the inside surface of the liner end through which it is passed, the surface exposed to the liner being roughened to provide a friction surface.

6. A basket liner comprising a flat, thin flexible paper-like strip, the opposed ends folded together and overlapping, a relatively stiff transverse member permanently attached to one end at two widely opposed points, two apertures in the other end through which the two ends of such member are adapted to penetrate, the member being adapted to be held flat against the inside surface of the liner end through which it is passed by the pressure of a mass of fruit contained within the liner.

7. A basket liner comprising a flat, thin, flexible paper-like strip, the opposed ends folded together and overlapping, a relatively stiff transverse member permanently attached to one end at two widely opposed points, two apertures in the other end through which the two ends of such member are adapted to penetrate, the member being adapted to be held flat against the inside surface of the liner end through which it is passed by the pressure of a mass of fruit contained within the liner, the surface of the member exposed to the fruit being relatively smooth, the surface exposed to the liner being roughened to provide a friction surface.

8. A basket liner comprising a sheet of relatively thin, flexible, smooth material, means for holding the ends thereof in overlapping relation and means associated therewith for frictionally resisting and positively limiting relative longitudinal displacement of said ends, said means including a sand paper-like coating associated with one end of the liner.

9. A basket liner comprising a flat, thin, flexible paper-like strip, the opposed ends folded together and overlapping, a relatively stiff transverse member permanently attached to one end at two widely opposed points, two apertures in the other end through which the two ends of such member are adapted to penetrate and frictional means adapted to yieldingly resist longitudinal displacement of the overlapping ends of the strip.

10. A basket liner comprising a sheet of relatively thin flexible material, means for holding the ends thereof in overlapping relation including a member permanently fastened to one end extending generally perpendicular to the longitudinal axis of the sheet and adapted to interlock with the other end thereof, friction means interposed between the member and the end with which it interlocks to resist relative longitudinal displacement, the member being fastened to the strip adjacent one of its ends the end holding means above referred to being adapted to permit relative longitudinal movement of the ends and after such movement to positively tie the ends together, the friction means being adapted to resist such relative movement up to the time that the holding means positively arrest it.

11. A basket liner comprising a sheet of relatively thin flexible material, means for holding the ends thereof in overlapping relation including a member permanently fastened to one end extending generally perpendicular to the longitudinal axis of the sheet and adapted to interlock with the other end thereof, such end being perforate to permit passage of the member, friction means interposed between the member and the end with which it interlocks to resist relative longitudinal displacement, the member being fastened to the strip adjacent one of its ends the end holding means above referred to being adapted to permit relative longitudinal movement of the ends and after such movement to positively tie the ends together, the friction means being adapted to resist such relative movement up to the time that the holding means positively arrest it.

12. A basket liner comprising a flat thin flexible paper like strip, the opposed ends folded together and overlapping, at least one of the ends being apertured, a single, separate relatively stiff transverse member permanently attached to one end of the liner strip and interlocking with the apertured end to resist relative longitudinal displacement of the ends.

13. A basket liner comprising a flat thin flexible paper like strip, the opposed ends folded together and overlapping, at least one of the ends being apertured, a single, separate relatively stiff transverse member permanently attached to one end of the liner strip and interlocking with the apertured end to resist relative longitudinal displacement of the ends, the attachment of the transverse member to the liner strip being at one end of the transverse member only.

14. A basket liner comprising a flat thin flexible paper-like strip, the opposed ends folded together and overlapping, at least one of the ends being apertured, a single, separate relatively stiff transverse member permanently attached to one end of the liner strip and interlocking with the apertured end to resist relative longitudinal displacement of the ends, the apertures through which the transverse member penetrates being longer in the direction of the longer dimension of the paper like strip than the width of the transverse member where it penetrates such aperture.

15. A basket liner comprising a flat thin flexible paper like strip, the opposed ends folded together and overlapping, at least one of the ends being apertured, a single, separate relatively stiff transverse member permanently attached to one end of the liner strip and interlocking with the apertured end to resist relative longitudinal displacement of the ends, the attachment of the transverse member to the liner strip being at one end of the transverse member only, the apertures through which the transverse member penetrates being longer in the direction of the longer dimension of the paper like strip than the width of the transverse member where it penetrates such aperture.

16. A basket liner comprising an elongated strip of relatively thin, smooth, flexible inextensible material, the opposed ends of which overlap, interlocking means associated with the overlapping ends and adapted to prevent separation thereof along lines perpendicular to their plane of contact, friction means interposed between the overlapping ends adapted to yieldingly resist their relative longitudinal displacement, stop means associated with the interlocking means for positively preventing further longitudinal displacement of the overlapping ends after a predetermined amount of longitudinal displacement has taken place.

DAVID O. LANE.